McNEELY & CADY.
Cultivator.
No. 81,807.
Patented Sept. 1, 1868.
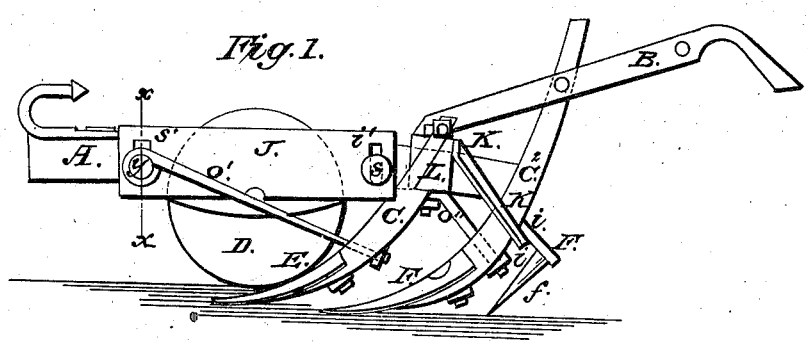
Fig. 1.
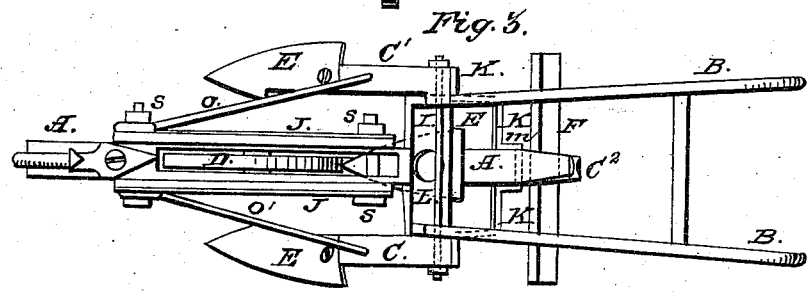
Fig. 2.
Fig. 3.

United States Patent Office.

D. McNEELY AND C. J. CADY, OF SPURGEON, INDIANA.

Letters Patent No. 81,807, dated September 1, 1868.

IMPROVEMENT IN CULTIVATORS.

*The Schedule referred to in these Letters Patent and making part of the same.*

TO ALL WHOM IT MAY CONCERN:

Be it known that we, D. McNEELY and C. J. CADY, of Spurgeon, in the county of Pike, and State of Indiana, have invented a new and improved Cultivator; and we do hereby declare that the following is a full, clear, and exact description of the construction and operation of the same, reference being had to the accompanying drawings, making a part of this specification, in which—

Figure 1 is a side elevation.
Figure 2 is a cross-section.
Figure 3 is a top view.

This invention has for its object to produce a cultivator which will be convenient and effective for plowing corn, cotton, tobacco, potatoes, and other vegetables, and which can be readily and easily adjusted for shallow or deep plowing, as circumstances may require.

In the drawings, A represents the draught-beam; B B, the handles; C $C^1$ $C^2$, the plow-standards; D, the wheel or roller, which regulates the depth to which the plows will run; E E, the plows; and F an attachable and detachable rake, having teeth, $f\,f$, and, when in position, fastened behind the rear standard, $C^2$, by means of a tongue or hook, $i$, which hooks into an eye or loop, $m$, attached to the rear standard. The eye may be formed by the bight of a metallic brace, K, which connects and supports the several parts of the cultivator, as shown in the drawings.

The rear plow-standard, $C^2$, is fixed to the rear end of the draught-beam. The other two are attached to a cross-beam, L, which is supported by the draught-beam.

The two forward plows are "rights and lefts," and may be changed on their standards, so as to throw the dirt inward or outward, or to either side.

The wheel D runs on a shaft, which has its bearings below the draught-beam, in plates J J, that press against the sides of the draught-beam, having ears below to receive and support the ends of the shaft. The plates may be of any suitable material—wood, iron, or other substance. In the drawings, they are represented as being mainly of wood, covered with a shield of sheet or plate metal, to protect them from injury by the set-screws, or otherwise. These plates can be adjusted up and down relatively to the draught-beam by slots and set-screws, shown at $s\,s'$, or by any other suitable device.

Braces, $o\,o'\,o''$, support and strengthen the different parts, as clearly shown in the drawings.

Having thus described our invention, what we claim as new, and desire to secure by Letters Patent, is—

1. The combination of the draught-beam A with plates J J, slots and set-screws $s\,s'$, and wheel D, substantially as described.

2. The arrangement of the beam A, handles B B, wheel D, plows E E E, standards C $C^1$ $C^2$, cross-beam L, braces K $o\,o'\,o''$, and attachable and detachable rake F, substantially as shown and described.

D. McNEELY,
C. J. CADY.

Witnesses:
THOS. FERGUSON,
H. W. TENAULT.